May 6, 1952          E. PITCHER          2,595,537
ROTARY TILLER FOR REMOVING QUACK GRASS AND THE LIKE
Filed July 12, 1945          3 Sheets-Sheet 3
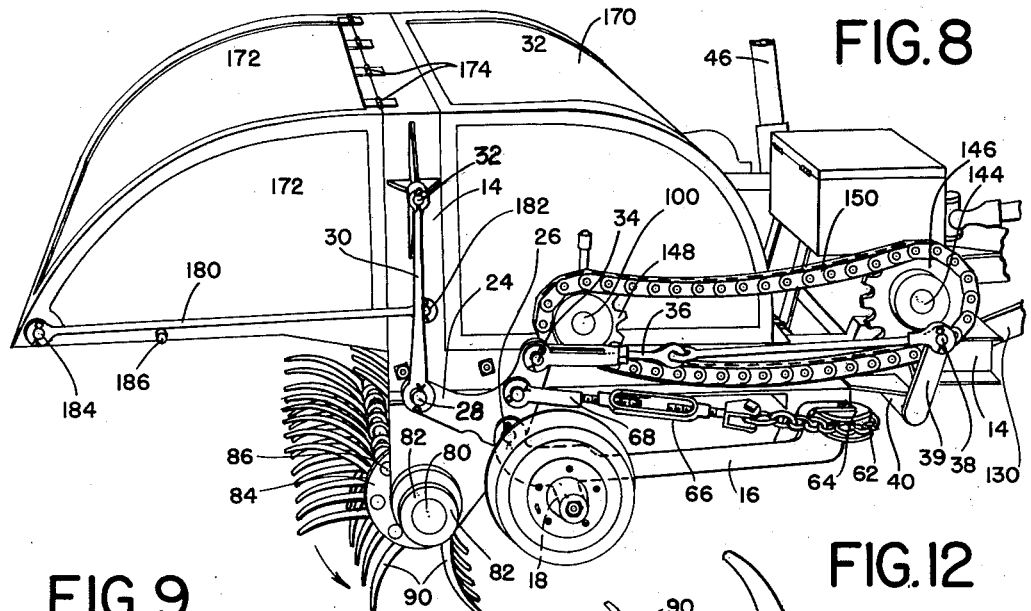
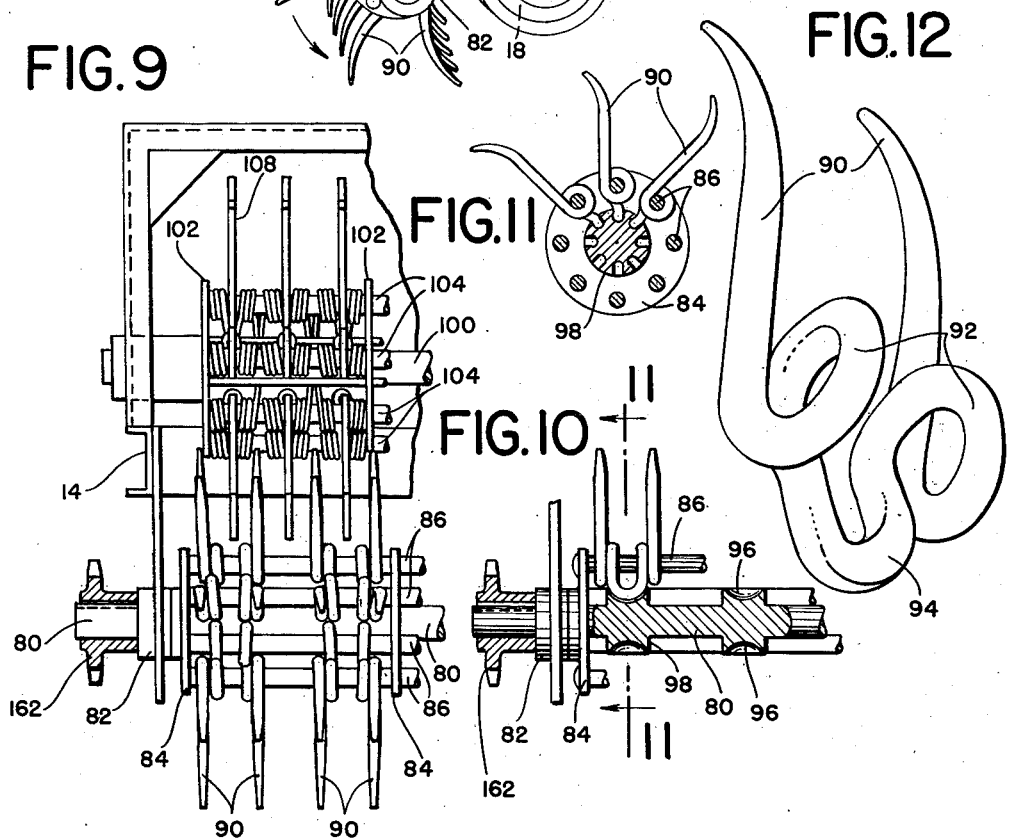
INVENTOR.-
ELMER PITCHER
BY Arthur R. Wylie ATTY.

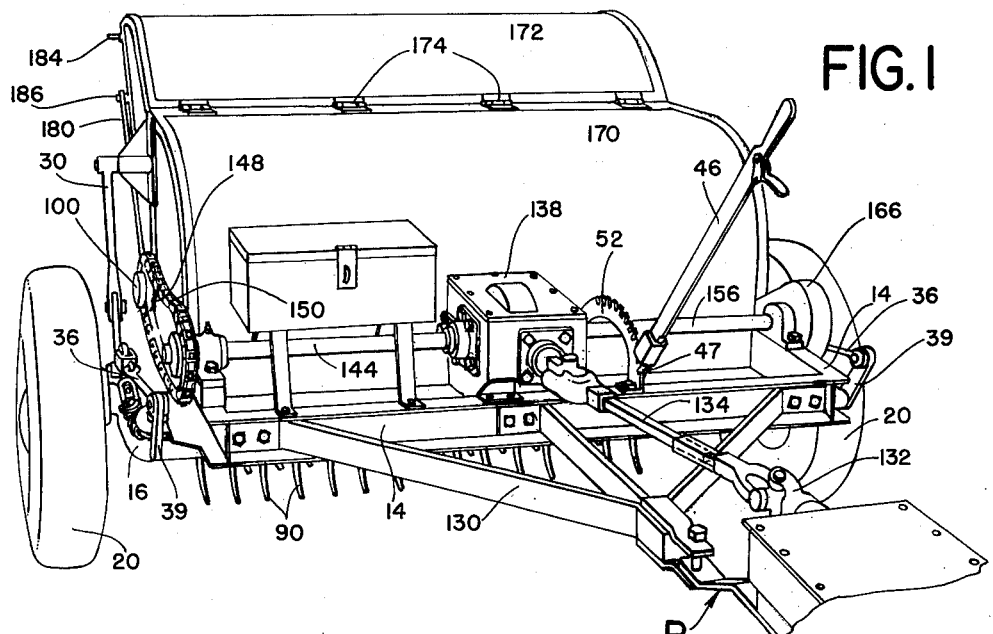
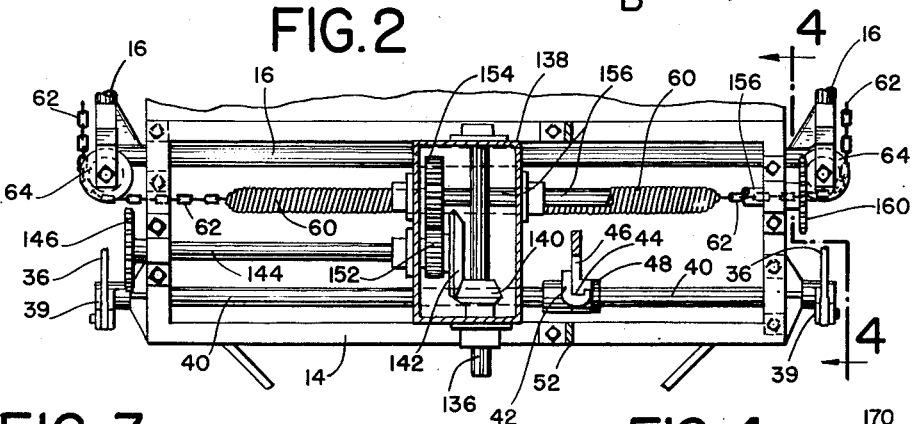
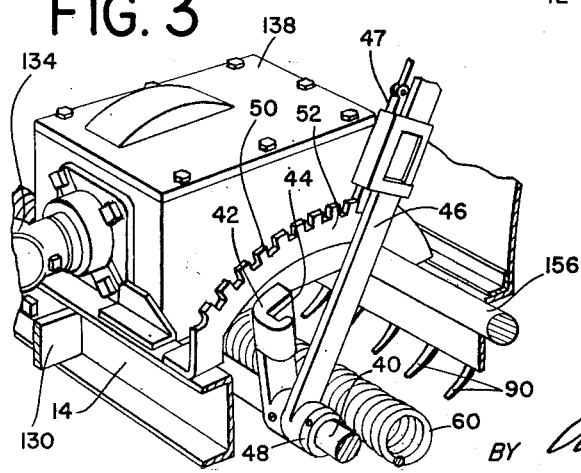
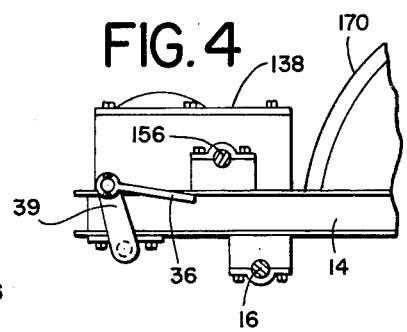

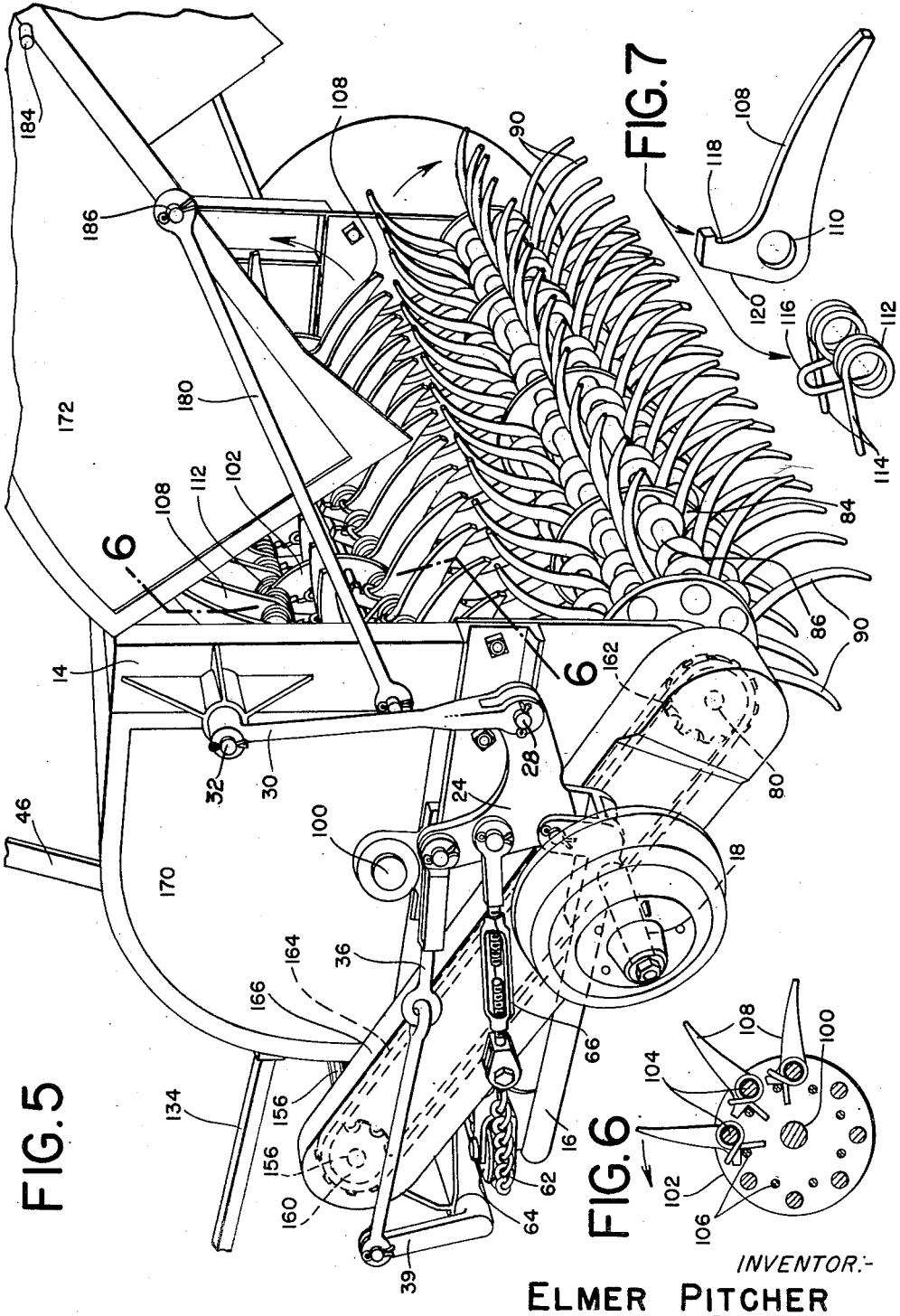

Patented May 6, 1952

2,595,537

UNITED STATES PATENT OFFICE 2,595,537

ROTARY TILLER FOR REMOVING QUACK GRASS AND THE LIKE

Elmer Pitcher, Minneapolis, Minn.

Application July 12, 1945, Serial No. 604,669

1 Claim. (Cl. 97—40)

An object of this invention is to provide a tillage implement for eradicating the roots of quack grass from soil and for leaving them lying on top of the soil so that they will wither and die.

Another object is the provision of a tillage implement which will harrow, aerate, and mulch the soil and leave it in good condition for planting.

Another object is to provide a simple and efficient mechanism for accomplishing this purpose and one which can be drawn by a tractor and whose digger mechanism is driven by the tractor engine.

These and other objects as will hereinafter appear are accomplished by this invention which is fully described in the following specification and shown in the accompanying drawings in which, Figure 1 is a perspective of a device embodying my invention;

Fig. 2 is a partial plan view partly in section showing the mechanism at the forward part of the device;

Fig. 3 is a partial enlarged perspective view of the gear box and showing the lever mechanism for raising and lowering the frame with respect to the ground wheels;

Fig. 4 is a partial reduced elevation on the line 4—4 of Fig. 2.

Fig. 5 is a perspective view of the machine showing the left wheel removed and the hood at the rear raised;

Fig. 6 is a partial vertical section on the line 6—6 of Fig. 5 showing the method of mounting the beater fingers;

Fig. 7 is an enlarged detailed perspective of one of the beater fingers and the spring with which it is mounted;

Fig. 8 is a perspective of the machine as viewed from the right side with the right ground wheel removed showing the hood lowered;

Fig. 9 is a partial top frame viewing showing the digger shaft with the number of digger teeth thereon and the beater shaft with the number of beaters passing between the digger teeth;

Fig. 10 is a partial detailed view similar to Fig. 9 showing the mounting of the digger teeth on the rods carried by the digger shaft;

Fig. 11 is a partial transverse section on the line 11—11 of Fig. 10; and

Fig. 12 is an enlarged perspective of one of the two-pronged digger teeth.

The embodiment illustrated comprises a digger of the class described having a main frame 14, to the forward end of which is hingedly mounted a U-shaped support 16 (Figs. 2, 5, and 8) terminating in axles 18, on which are journaled ground wheels 20 in a well known manner. These wheels serve for transporting the implement with the digger elements raised as will hereinafter be fully described, and they serve to limit the depth to which the digger elements enter the ground when the machine is in operation as a tillage implement.

At each side of the U-shaped support 16, is a bell crank 24, which is pivotally mounted thereon by means of a pin 26. The rear end of the bell crank is pivotally connected by means of a pin 28, to a link 30, the upper end of which is pivotally mounted on a pin 32, carried by the frame 14.

The opposite end of the bell crank 24 is pivotally connected through a pin 34 with an adjustable link 36, the forward end of which is pivotally connected through a pin 38 with a crank 39 and transverse shaft 40 hingedly mounted beneath the frame 14. This transverse shaft 40, as shown in Fig. 3, has pinned thereon a stub lever 42, which has at its outer end a recess 44 adapted to engage an operating lever 46 which is loosely mounted for rotation on the shaft 40, adjacent the stub lever 42. A set collar 48 serves to hold the levers in alignment.

The operating lever 46 carries a spring-pressed pawl 48, which operates in a well known manner to engage any of the teeth or notches 50 in the quadrant 52 which is made concentric with the shaft 40. The relation of the stub lever 42 to the operating lever 46 will later be explained.

The weight of the mechanism falling on the links 36 is largely counterbalanced by means of a heavy transversely located spring 60, to each end of which is attached a chain 62 (Fig. 2) passing around a sheave 64 which is pivotally mounted on each forward corner of the support 16. These chains connect through a suitable turnbuckle 66 and the links 68 to the bell cranks 24, the whole being so adjusted as to largely counterbalance the weight of the main frame and parts carried thereby so as to make the movement of the operating lever 46 relatively easy.

A digger shaft 80 extends transversely across the main frame parallel to the axles 18, and is suitably journaled in bearings 82, on each side of the frame. This shaft carries a series of spaced flanges 84 (Fig. 9) which are keyed, or otherwise rigidly secured thereon. Series of rods 86 are spaced about the shaft as shown particularly in Fig. 11. On these rods are placed, series of two-pronged digger teeth 90, shown in enlarged perspective in Fig. 12, and coiled on each side to form circular rings 92 through which loosely pass the rods 86. The bottom 94 of these digger teeth is curved and adapted to engage a notch 96 in an enlargement 98 (Fig. 10) on the digger shaft 80. These digger teeth are generally U-shaped and are made pointed and curved forwardly in the direction of rotation of these digger teeth as is clearly shown in Fig. 8.

Thus it will be seen that this method of forming and mounting these digger teeth permits them to yield on striking an obstruction such as a rock, both laterally along the rods 86, and circumferentially about the digger shaft 80, as well as permitting the horns of each pair to move toward or from each other.

The drive for the digger shaft 80 will be described later in connection with the description of the drive for the beater shaft, the construction of which will now be explained. The beater shaft 100 (Fig. 9) is suitably journaled to the main frame and has secured thereon a series of flanges 102 through which pass rods 104 which are shown in detail in Fig. 6. Longitudinal rods 106 pass through the flanges 102 and are secured therein. Beater fingers 108 are provided with holes 110 by means of which they are pivotally mounted on the rods 104, surrounded by coil springs 112 which also loosely pass around rods 104 and which have ends 114 which engage with one of the rods 106 which serve also as a forwardly-positioning means for the beater fingers 108.

Each spring 112 has a central U-shaped portion 116 which is adapted to lie in a notch 118 of the beater fingers 108. The shoulder 120 on the beater finger 108 thus normally bears against one of the rods 106 while the ends 114 and the spring bear against the other side of the rods to hold the beater fingers in this normal position. These beater fingers rotating rapidly between the digger teeth, as will later be more fully described, are thus yieldably mounted by means of springs 112 on the rods 104 so that they readily yield in case they encounter anything wedged or carried by the digger teeth.

The drives for the digger shaft 80 and the beater shaft 100 are illustrated largely in Figs. 1 and 2, and will now be described. A hitch 130 connects this implement to a drawbar B of a tractor. This tractor also has a suitable drive shaft 132 extending rearwardly which connects through a suitable coupler 134 with a shaft 136 (Fig. 2), journaled in a suitable gear box 138. This shaft carries a bevel pinion 140 meshing with a bevel gear 142 on a shaft 144 which is suitably journaled on the main frame and which has keyed thereon a sprocket 146 driving a sprocket 148 on the beater shaft 100 through a chain 150.

Referring to Fig. 2, the shaft 144 has keyed thereon spur gear 152 which meshes with a spur gear 154 on a shaft 156, which, as shown in Fig. 1, is suitably journaled on the main frame and has keyed thereon a sprocket 160 which, as shown in Fig. 5, drives a sprocket 162 keyed on the digger shaft 80 by means of a chain 164. These sprockets and this chain are inclosed in a suitable housing 166. A similar housing not shown is provided for the chain 150 and its associated sprockets.

The digger shaft is driven in a counter-clockwise direction as shown in Fig. 8, so that it tends to dig in and lift the dirt through which it passes. The beater shaft is driven in a clockwise direction as viewed in Fig. 8, and at a very much higher rate of speed so as to free the digger shaft of sticks, stones, weeds, roots, and the like which may have a tendency to be collected thereon and to throw this material backward.

For this reason the beater shaft is inclosed within a fixed housing 170, while a hood 172 is hingedly mounted at its top to the main frame 14 on a series of hinges 174. A rod 180 is provided at each side of the frame and pivotally mounted on a pin 182, while the opposite end of the rod is adapted to engage either the pin 184 as shown in Fig. 8, for holding the hood in its lowered position, or to engage pins 186 as shown in Fig. 5, for holding the hood in the raised position.

With the hood raised as shown in Fig. 5, the material, particularly the roots of quack grass and the like, will be thrown well back of the machine, but with the hood lowered as shown in Fig. 8, there is much greater tendency for soil to be thrown over these roots and for them to again take root.

This device is intended primarily for tearing the roots of quack grass out of the ground and leaving them deposited on top of the soil where they will rapidly wither and die. For this purpose the hood 172 is held in the raised position as in Fig. 5.

Referring now to Fig. 3, the operating lever 46 is set for the maximum depth desired for the digger teeth and these teeth will ordinarily maintain themselves at the depth for which the lever is set. Should they, however, strike a rock, stump, or other obstruction, they will be lifted out of the ground causing the stub lever 42 to move forwardly away from the lever 46 somewhat as is shown in Fig. 3.

Thus it will be seen that I have provided a very simple and efficient form of tillage implement which eradicates quack grass and the like and deposits it on the surface of the ground where it will immediately die. This device also serves to mulch and aerate the soil so as to leave it in excellent condition for planting.

While I have shown and described but a single form of my invention it is to be understood that it is capable of many modifications. Changes, therefore, in the construction and arrangement may be made which do not depart from the spirit and scope of the invention as disclosed in the appended claim.

I claim as my invention:

In a tillage implement a frame adapted to be drawn by a tractor, a shaft journaled on the frame and carrying digger teeth, a U-shaped support pivotally mounted on the frame, a ground-engaging wheel pivotally mounted on the support at each side of the frame, a rotatable shaft operatively connected to pivot the U-shaped support, a stub lever secured to the rotatable shaft, an operating lever pivotally mounted on the rotatable shaft and adapted to limit rotation of the stub lever in one direction, said stub lever being free to move away from the operating lever to permit ground obstructions to raise the frame assembly, a notched quadrant, and a pawl on the operating lever for engaging notches in the quadrant for limiting the depth to which the digger teeth can penetrate the soil but which will permit said teeth to ride up over an obstruction in the ground.

ELMER PITCHER.

REFERENCES CITED

The following references are of record in the file of this patent:

UNITED STATES PATENTS

| Number | Name | Date |
|---|---|---|
| 541,411 | Allerton et al. | June 18, 1895 |
| 1,244,531 | Menzenbach | Oct. 30, 1917 |
| 1,600,215 | Clarkson | Sept. 21, 1926 |
| 1,841,906 | Nelson et al. | Jan. 19, 1932 |
| 2,054,129 | Kelsey | Sept. 15, 1936 |
| 2,176,261 | Kelsey | Oct. 17, 1939 |
| 2,199,954 | Kelsey | May 7, 1940 |
| 2,214,702 | Seaman | Sept. 10, 1940 |
| 2,221,221 | Seaman | Nov. 12, 1940 |
| 2,241,675 | Rinehart | May 13, 1941 |
| 2,364,666 | Seaman | Dec. 12, 1944 |
| 2,366,386 | Clark | Jan. 2, 1945 |
| 2,375,137 | Rutishauser | May 1, 1945 |
| 2,380,323 | Morkoski | July 10, 1945 |
| 2,501,364 | Traver | Mar. 21, 1950 |

FOREIGN PATENTS

| Number | Country | Date |
|---|---|---|
| 49,297 | Austria | Aug. 10, 1911 |